United States Patent [19]

Koga et al.

[11] Patent Number: 5,530,609
[45] Date of Patent: Jun. 25, 1996

[54] MAGNETIC RECORDING/REPRODUCING METHOD USING A THIN FILM MAGNETIC

[75] Inventors: Keiji Koga; Tsuneo Kagotani; Akinori Nishizawa; Kazumasa Fukuda; Masanori Sakai, all of Nagano, Japan

[73] Assignee: TDK Corporation, Tokyo, Japan

[21] Appl. No.: 251,360

[22] Filed: May 31, 1994

[30] Foreign Application Priority Data

| | | | |
|---|---|---|---|
| May 31, 1993 | [JP] | Japan | 5-152972 |
| May 31, 1993 | [JP] | Japan | 5-152973 |

[51] Int. Cl.⁶ .............. G11B 5/706; G11B 5/00
[52] U.S. Cl. ............. 360/131; 360/113; 360/135
[58] Field of Search ............. 360/131–135, 360/113

[56] References Cited

U.S. PATENT DOCUMENTS

| | | | |
|---|---|---|---|
| 4,745,510 | 5/1988 | Watanabe et al. | 360/131 |
| 5,140,486 | 8/1992 | Yokoyama et al. | 360/125 |
| 5,181,149 | 1/1993 | Katsumata et al. | 360/119 |
| 5,182,693 | 1/1993 | Koga et al. | 360/135 |
| 5,218,500 | 6/1993 | Okuda et al. | 360/126 |

FOREIGN PATENT DOCUMENTS

| | | |
|---|---|---|
| 0279535 | 8/1988 | European Pat. Off. . |
| 62-49656 | 10/1987 | Japan . |
| 62-50888 | 10/1987 | Japan . |
| 63-13242 | 3/1988 | Japan . |
| 3-157801 | 7/1991 | Japan . |

OTHER PUBLICATIONS

Patent Abstracts of Japan, vol. 13, No. 424 (P–934), Sep. 21, 1989, JP-A-01 155502, Jun. 19, 1989.
Patent Abstracts of Japan, vol. 10, No. 271 (P–497), Sep. 16, 1986, JP-A-61 094230, May 13, 1986.
IEEE Transactions on Magnetics, vol. 27, No. 6, pp. 4678–4683, Nov 1991, H. Takano, et al., "Submicron–Trackwidth Inductive/MR Composite Head".

*Primary Examiner*—John H. Wolff
*Attorney, Agent, or Firm*—Oblon, Spivak, McClelland, Maier & Neustadt

[57] ABSTRACT

In a method for magnetically recording and reproducing signals in and from a magnetic recording medium via a thin film magnetic head, the recording medium has a magnetic layer of up to 0.5 μm thick containing hexagonal ferromagnetic particles on a non-magnetic substrate, and the magnetic head includes a recording head whose gap adjacent portion is formed of a soft magnetic material having a saturation magnetic flux density of at least 0.7 T and a reproducing MR head. In one form, the magnetic layer has a surface roughness (Ra) of up to 5 nm, and a coercivity (Hc) of at least 1,100 Oe and a squareness ratio (S) of at least 0.70. In another form, the magnetic layer contains hexagonal ferrite and has a squareness ratio (S⊥) of at least 0.70, and the magnetic head produces a reproduction output which is subject to zero-crossing detection without passing through a differential circuit.

9 Claims, 3 Drawing Sheets

MAGNETIC RECORDING/REPRODUCING METHOD USING A THIN FILM MAGNETIC

BACKGROUND OF THE INVENTION

This invention relates to a method for magnetically recording and reproducing signals in and from a magnetic recording medium via a magnetic head and more particularly, to such a method for magnetically recording and reproducing digital signals in a high density.

Most magnetic recording devices used in computers and video machines rely on the mode of recording and reproducing information signals in and from magnetic recording media by moving electromagnetic induction-type transducer elements as typified by magnetic heads relative to the magnetic recording media in close proximity or contact relationship to the surface thereof. To meet the demands for greater capacity, higher transfer speed and smaller size, the development efforts now made on these magnetic recording devices aim at high density recording. To accommodate such high density recording, magnetic recording media should have magnetic layers which have higher coercivity, reduced thickness and smoothness. On the side of magnetic heads, it is desired to have a narrower gap and higher saturation magnetic flux density.

Magnetic recording media used in the prior art are generally coated magnetic recording media having a magnetic coating layer which is formed by coating a magnetic composition containing magnetic powder and a binder. Such coated magnetic recording media are widely used in the form of magnetic tape and magnetic disks due to their advantage that the magnetic coating has low surface energy and can have a substantial amount of lubricant impregnated in its interior so that it may provide low friction to the head and be well durable against sliding contact with the head. However, the coated media have the drawback that they are low in residual magnetization because the magnetic recording layer contains more amounts of non-magnetic components such as the binder and abrasive and therefore, they cannot be increased in reproduction output. The magnetic recording media of this type use gamma-$Fe_2O_3$ and cobalt-adsorbed gamma-$Fe_2O_3$ as magnetic powder. These magnetic powders, however, have low coercivity of about 1,000 Oe at maximum and are not sufficient for high-density recording.

Under the circumstances, a switch is partially made to the use of metal thin film type magnetic recording media having a continuous thin film type magnetic layer because they have excellent electromagnetic properties and allow for high-density recording. For the preparation of metal thin film type magnetic recording media, there are known various methods including plating methods such as electroplating, chemical plating, and electroless plating, deposition methods such as vacuum evaporation and sputtering as well as sol-gel methods.

As the magnetic material for the continuous thin film type magnetic disks, metal thin films of CoNiCr, CoNiP or the like and metal oxide thin films of $\gamma$—$Fe_2O_3$ were developed. Preference is made to metal thin film media capable of reproducing greater outputs by virtue of increased remanence. The metal thin film type magnetic recording media, however, have the drawback that the media are less durable in that their surface is prone to damage by contact with the head. Further the magnetic recording media are less reliable because head adsorption often occurs due to increased friction between the media and the head.

Additionally, the magnetic film is prone to oxidation during long-term storage, leaving problems including occurrence of pinholes in the magnetic film and a lowering of magnetization quantity which leads to output lowering and error occurrence. It is then a common practice to form on the magnetic layer surface a protective layer such as a ceramic film, silicon oxide film and lubricant film, with the results being still unsatisfactory.

To further improve recording density and increase record data transfer speed, it is required to shift the recording frequency to a higher side. Recording at higher frequencies entails the problem that output is dampened by the inductance of the head. This can be overcome by reducing the number of coil turns in the head which in turn, rather causes a lowering of reproduction output. It is then difficult to increase storage capacity.

One solution to these problems is to reduce the inductance of the head. For example, there are known multi-layer heads having alternately deposited films of a high saturation magnetic flux density material and a non-magnetic material on a non-magnetic substrate. Thin film type heads featuring more efficient reproduction are also used to further reduce the inductance.

Also proposed were inductive/magnetoresistance composite thin film heads using a magnetoresistance (MR) element as a reproducing head. Since a significant improvement in reproduction output is achieved by the use of an MR element as the reproducing head, even magnetic recording media having low remanence lend themselves to high density recording/reproducing operation. Use of thin film type magnetic heads including an MR element as the reproducing head and having a low inductance enables high-frequency recording and high-density recording.

Nevertheless, when high-frequency recording is effected on sputtered or plated metal thin film type magnetic recording media using such thin film type magnetic heads, there occurs modulation noise inherent to the metal thin film type media, so that the recording density cannot be increased. More particularly, the metal thin film type magnetic recording media which are prepared by sputtering or plating techniques have uniform, continuous magnetic thin films so that they have high remanence and provide high reproduction outputs. If the recording frequency is increased for high-density recording and high-speed transfer, a drastic increase of modulation noise occurs which prohibits high-density recording. It is contemplated that such modulation noise occurs in the metal thin film type magnetic recording media because in magnetization inverted regions of the magnetic thin film where signals are recorded, the magnetic wall of the inverted boundary moves to provide a heterogeneous boundary so that the magnetization inversion transition region is spread.

One effective approach for minimizing the noise associated with the shifting magnetic wall in metal thin film media is to add non-magnetic material to control the growth of the magnetic wall. This raises the problems of decreased remanence and coercivity squareness ratio. This results in losses of reproduction output and linear recording density, rendering it difficult to improve recording density.

Therefore, the head must be reduced in inductance to increase reproduction output and the recording medium must be reduced in noise before high-frequency recording can be achieved to establish a high-density, high-transfer-speed recording method.

Under the above-mentioned situation, the inventors made research on the magnetic recording of signals in magnetic recording media using magnetic heads so as to ensure high recording density, high-speed data transfer, durability and reliability.

Therefore, an object of the present invention is to provide a magnetic recording/reproducing method featuring high-density recording while ensuring durability and reliability.

Another object of the present invention is to provide a cost-effective magnetic recording/reproducing method using a magnetic recording medium which can be manufactured in high productivity and at low cost.

From this point of view, the inventors previously proposed in JP-A 157801/1991 a method for effecting magnetic recording/reproducing operation on a magnetic disk using a flying magnetic head. The magnetic disk includes a rigid substrate and a magnetic layer formed thereon by coating a magnetic coating composition containing ferromagnetic metal submicron particles. The method is characterized in that the magnetic layer has a coercivity of at least 1,100 Oe and a thickness of up to 0.5 μm, and at least a portion of the flying head that is disposed adjacent a gap is formed of a soft magnetic material having a saturation magnetic flux density of at least 0.7 T.

The magnetic disk of the previous proposal can be manufactured in high productivity and at low cost. The method ensures high-density recording, acceptable overwrite characteristics, and reliable magnetic recording/reproducing operation.

A system wherein the above-mentioned medium is combined with an inductive, MR composite thin film head allows for an increase of recording density because there occurs no noise associated with the magnetic wall which would otherwise be observed in short-wavelength recording of metal thin film media. However, acicular submicron particles, for example, of α-Fe metal used in the recording medium have magnetic anisotropy which develops due to shape magnetic anisotropy. This implies that variations in shape or particle size are directly reflected by variations in coercivity.

On the other hand, magnetic particles should have a narrow particle size distribution in order to reduce the coercivity distribution which is one of the causes for modulation noise to occur in a coated magnetic film for thereby reducing the noise associated with the medium. However, there is a certain limit in reducing the particle size distribution. Then even when the magnetic recording medium constructed according to the previous proposal is used, we encountered a limit in reducing the noise of the medium. Another problem arose that linear recording density could not be increased since a high coercivity squareness ratio was not available.

To attain the above-mentioned objects, the present invention in a first form provides a method for magnetically recording and reproducing signals in and from a magnetic recording medium via a thin film type magnetic head. The magnetic recording medium includes a non-magnetic substrate and a magnetic layer formed thereon by coating a composition containing hexagonal ferromagnetic submicron particles and a binder. The magnetic layer has a thickness of up to 0.5 μm, a surface roughness (Ra) of up to 5 nm, and a coercivity (Hc) of at least 1,100 Oe and a squareness ratio (S) of at least 0.70 as measured in the direction of movement relative to the head. The magnetic head includes a recording head in which at least a portion thereof disposed adjacent a gap is formed of a soft magnetic material having a saturation magnetic flux density of at least 0.7 T and a reproducing head which is formed of a soft magnetic material having magnetoresistance effect.

Preferably, hexagonal ferromagnetic submicron particles are barium ferrite submicron particles and the magnetic layer has a coercivity squareness ratio (S*) of at least 0.80 as measured in the direction of movement relative to the head.

In a second form of the invention directed to a method for magnetically recording and reproducing signals in and from a magnetic recording medium via a thin film type magnetic head, the magnetic recording medium includes a non-magnetic substrate and a magnetic layer containing a hexagonal ferrite magnetic material. The magnetic layer has a thickness of up to 0.5 μm and a squareness ratio (S⊥) of at least 0.70 as measured in a direction perpendicular to the recording surface thereof. The magnetic head includes a recording head in which at least a portion thereof disposed adjacent a gap is formed of a soft magnetic material having a saturation magnetic flux density of at least 0.7 T and a reproducing head which is formed of a soft magnetic material having magnetoresistance effect. The magnetic head produces a reproduction output which is subject to zero-crossing detection without passing through a differential circuit.

Preferably, the hexagonal ferrite magnetic material is a barium ferrite magnetic material and the magnetic layer has a coercivity squareness ratio (S⊥*) of at least 0.90 as measured in a direction perpendicular to the recording surface thereof. Also preferably, the medium is a coated magnetic recording medium having a magnetic layer formed by coating a magnetic coating composition and the magnetic layer has a surface roughness (Ra) of up to 5 nm. Further preferably, the magnetic layer has a coercivity (Hc) of at least 1,100 Oe as measured in the direction of movement relative to the head.

In either form, the head preferably has an inductance of up to 2 μH.

BENEFITS OF THE INVENTION

The first form has the following benefits.

Since the magnetic recording medium used in the first form has a coated magnetic layer, it can be manufactured in high production yields and at low cost. The medium has minimal friction to the thin film head and is free of adsorption or sticking. The medium is fully stable under various environments and thus durable and reliable.

Since the recording/reproducing method of the invention uses the magnetic recording medium having the magnetic layer which is limited in thickness, surface roughness, and coercivity and squareness ratio in the moving direction relative to the head, in combination with the thin film magnetic head of the above-mentioned configuration, signals of high frequency can be recorded and reproduced with minimal noise. The inventive method thus establishes a recording system featuring high density, high transfer speed and high reliability.

These benefits are available with the recording/reproducing method of the invention because a coated recording medium having the advantages of minimal noise and high linear recording density is combined with an inductive, MR composite thin film head having the advantages of low inductance and greater reproduction output.

Such a low noise medium is given by a magnetic recording medium of the above-mentioned construction using hexagonal magnetic particles as the magnetic powder. The hexagonal magnetic particles have magnetic anisotropy which develops due to crystal magnetic anisotropy, that is, have coercivity which develops due to the crystalline structure of the magnetic particles. Then the hexagonal magnetic particles experience substantially smaller influence of shape on coercivity distribution than acicular magnetic particles. Hexagonal magnetic particles of uniform crystalline structure can be manufactured in a relatively simple manner. Use of such magnetic powder facilitates manufacture of a coated magnetic recording medium having a narrow coercivity distribution.

Additionally, the coated magnetic recording medium does not generate noise associated with the magnetic wall as found in metal thin film media since magnetic submicron particles are separated by the non-magnetic binder. The medium of the structure and construction as defined herein experiences minimal noise.

The MR head must be electrically insulated from the magnetic recording medium because current flow must be applied across the MR head for sensing purpose. The magnetic film of the magnetic recording medium of the above-mentioned construction has an electric resistance which can be significantly increased. This provides a stable interface with the inductive, MR composite head. The insulating protective film on the head can be reduced in thickness to minimize the spacing loss. These also contribute to a high-density recording/reproducing system.

The recording/reproducing method of the invention allows for recording at a high frequency without generating medium-associated noise and reproduction with high output. Possible recording at a high linear recording density leads to recording/reproducing operation featuring high density and high transfer speed.

The benefits of the second form are as follows.

Since the magnetic recording medium used in the second form has a magnetic layer containing a hexagonal ferrite magnetic substance, the medium has minimal friction to the thin film head and is free of adsorption or sticking. The medium is fully stable under various environments and thus durable and reliable.

Since the recording/reproducing method of the invention uses the magnetic recording medium having the magnetic layer which is limited in thickness and squareness ratio in a direction perpendicular to the recording surface that is the direction of movement relative to the head, in combination with the thin film magnetic head of the above-mentioned configuration, signals of high frequency can be recorded and reproduced with minimal noise. However, when the magnetic recording medium has a squareness ratio in the perpendicular direction within the above-defined range, the MR head reproduces an output whose waveform is distorted due to the influence of a perpendicular magnetization component. As a result, the zero-crossing point is shifted in phase to substantially exacerbate the bit shift to such an extent that practical data cannot be read out. By subjecting the reproduction output to zero-crossing detection without passing through a differential circuit, the present method prevents exacerbation of the bit shift and increases linear recording density.

The inventive method thus establishes a recording system featuring high density, high transfer speed and high reliability.

These benefits are available with the recording/reproducing method of the invention by combining a recording medium of the above-mentioned construction having a high linear recording density with an inductive, MR composite thin film head having a low inductance and greater reproduction output and by subjecting the reproduction output to zero-crossing detection without passing through a differential circuit.

Such a low noise medium is given by a magnetic recording medium of the above-mentioned construction using a hexagonal ferrite magnetic material as the magnetic substance. Since the hexagonal ferrite magnetic material has magnetic anisotropy which develops due to crystal magnetic anisotropy, the hexagonal ferrite magnetic material experiences substantially smaller influence of shape on coercivity distribution than acicular magnetic particles. Hexagonal particles of uniform crystalline structure can be prepared in a relatively simple manner, and thin films containing the same be readily prepared. Use of such magnetic substance facilitates manufacture of a magnetic recording medium having a narrow coercivity distribution.

Additionally, the hexagonal ferrite-bearing magnetic recording medium does not generate noise associated with the magnetic wall as found in metal thin film media since crystal grains and magnetic submicron particles are separated by non-magnetic elements and non-magnetic binder. The medium of the structure and construction as defined herein experiences minimal noise.

The MR head must be electrically insulated from the magnetic recording medium because current flow must be applied across the MR head for sensing purpose. The magnetic film of the magnetic recording medium of the above-mentioned construction has an electric resistance which can be significantly increased. This provides a stable interface with the inductive, MR composite head. The insulating protective film on the head can be reduced in thickness to minimize the spacing loss. These also contribute to a high-density recording/reproducing system.

The recording/reproducing method of the invention allows for recording at a high frequency without generating medium-associated noise and reproduction with high output. Possible recording at a high linear recording density leads to recording/reproducing operation featuring high density and high transfer speed.

DESCRIPTION OF THE PREFERRED EMBODIMENTS

Figure 1:
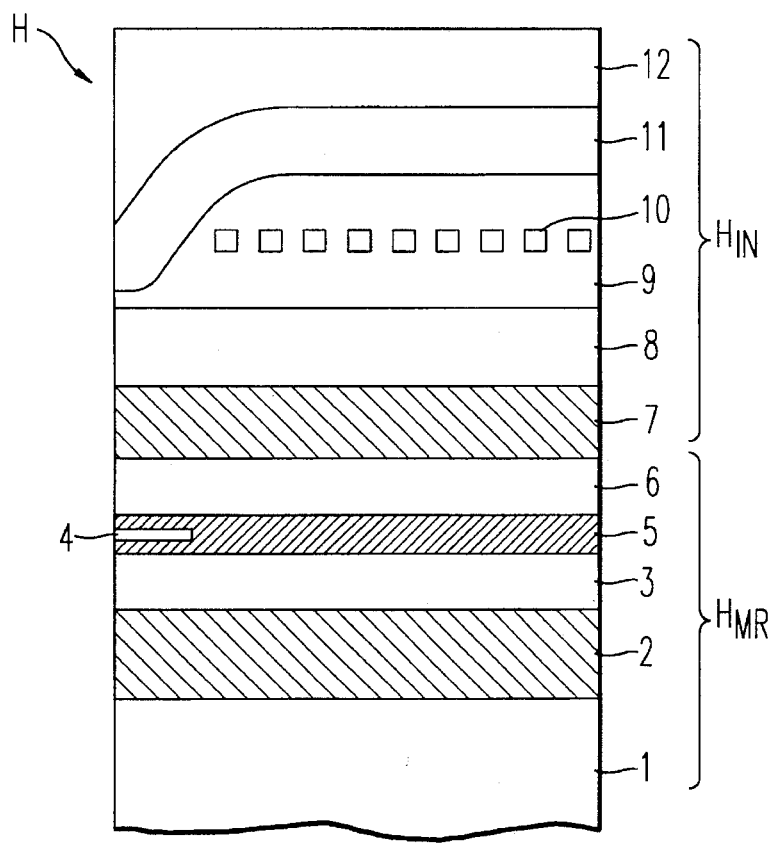
FIG. 1 is a cross-sectional view of one exemplary thin film magnetic head used in the present invention.

Magnetic recording medium
First form

The magnetic recording medium used herein includes a non-magnetic substrate and a magnetic layer. The magnetic layer is formed on the substrate by coating a composition containing hexagonal ferromagnetic submicron particles and a binder.

The magnetic layer has a coercivity (Hc) of at least 1,100 Oe as measured in the direction of movement relative to the head. With coercivity below this value, no satisfactory electromagnetic properties are available, high-density recording is difficult, and no high output is obtained upon reproduction. The coercivity of the magnetic layer is selected, while taking into account the performance of the magnetic head to be combined therewith, such that satisfactory overwrite characteristics may be available. The upper limit of coercivity is preferably 2,000 Oe though not critical. Preferably the magnetic layer has a coercivity in the range of 1,400 to 2,000 Oe.

Also the magnetic layer has a squareness ratio (S) of 0.70 to 1 as measured in the direction of movement relative to the head. With a squareness ratio below this value, output signals are distorted in waveform and less normal signals are available. Due to the influence of a residual magnetization component in the perpendicular direction, an inverted waveform is generated at the initial of reproduce wave, preventing normal processing of reproduction signals and exacerbating recording/reproducing characteristics.

When signals were recorded and reproduced in and from a magnetic recording medium using hexagonal magnetic particles as the magnetic powder, but having a squareness ratio of less than 0.7 using an MR head as the read head, the output waveform was distorted so that no satisfactory recording/reproducing characteristics were available. As a result, the bit shift (BS) quantity was significantly exacerbated to render practical recording/reproducing operation difficult. This is because the reproducing MR head is sensitive to a component magnetized perpendicular to the direction of medium movement relative to the head.

Further, the magnetic layer has a thickness of up to 0.5 µm. This limitation eliminates the problems of magnetic layers thicker than 0.5 µm that no satisfactory overwrite characteristic is available, saturation recording is difficult especially in short wavelength recording, and thickness loss is increased to restrain high-density recording. The lower limit of the magnetic layer thickness is not critical although the lower limit of 0.05 µm is preferred in order to ensure satisfactory reproduction output and S/N ratio. The magnetic layer is preferably 0.08 µm to 0.3 µm thick.

Finally the magnetic layer has a surface roughness reduced to 5 nm or less down to the detection limit, the surface roughness Ra being defined by JIS B 0601. Ra values of up to 5 nm are effective for reducing noise from the medium upon high-density recording so that the S/N and C/N ratios of recording/reproducing operation are fully improved.

The magnetic layer is adjusted to Ra in the above-defined range by forming a magnetic coating and smoothing the surface thereof by means of calender rolls or by polishing the surface of the magnetic coating as cured.

In one preferred embodiment, the hexagonal ferromagnetic submicron particles used in the magnetic layer are hexagonal ferrite submicron particles such that the magnetic layer has a coercivity squareness ratio (S*) of at least 0.80 as measured in the direction of movement relative to the head. Then the medium has a high recording density, high reproduction output and extremely low noise. With a coercivity squareness ratio (S*) of less than 0.80, the medium noise would increase and the linear recording density would lower. The coercivity squareness ratio (S*), which does not exceed 1.0 on principle, preferably ranges from 0.9 to 1 and is more preferably as approximate to 1.0 as possible.

Although no particular limit is imposed on the hexagonal ferrite submicron particles used herein, preferred hexagonal ferrite submicron particles are oxide submicron particles of barium ferrite and strontium ferrite. Examples of the barium ferrite include hexagonal barium ferrites such as $BaFe_{12}O_{19}$ and substituted barium ferrites in which Ba and Fe are partially substituted by at least one metal selected from the group consisting of Ca, Sr, Pb, Co, Ni, Ti, Cr, Zn, In, Mn, Cu, Ge, Nb, Zr, and Sn. Examples of the strontium ferrite include hexagonal strontium ferrites such as $SrFe_{12}O_{19}$ and similarly substituted strontium ferrites. Also useful is hexagonal ferrite which is modified on the surface with spinel type ferrite in order to provide an increased magnetization quantity and improved temperature coefficient. Further useful are ferrite particles having a coating of oxide or organic compound formed on the surface in order to improve weatherability and dispersion.

The hexagonal ferrite submicron particles have a size which may be determined in accordance with the particular construction of the intended magnetic layer. From the standpoint of electromagnetic properties, the hexagonal ferrite submicron particles preferably have a mean particle size of up to 0.15 µm, more preferably 0.02 to 0.10 µm and a flakiness of at least 2, more preferably about 3 to 10.

It is understood that hexagonal ferrite submicron particles are prepared by any of conventional methods including ceramic, co-precipitation/firing, hydrothermal synthesis, flux, glass crystallization, alkoxide, and plasma jet methods. For these methods, reference is made to Koike and Kubo, Ceramics, Vol. 18, No. 10 (1983).

Used in forming the magnetic layer is a magnetic coating composition which is generally prepared by mixing the above-mentioned magnetic submicron particles with a binder and a solvent.

The binder used herein is not particularly limited and may be selected for a particular purpose from thermosetting resins, reactive resins and radiation-curable resins. Thermosetting and radiation-curable resins are preferred because coatings should have sufficient film strength and high durability even with a reduced thickness.

Examples of the thermosetting resin include resins of condensation polymerization type such as phenolic resins, epoxy resins, vinyl copolymer resins, vinyl phenol resins, polyurethane resins, urea resins, butyral resins, formal resins, melamine resins, silicone resins, acrylic reactive resins, polyamide resins, epoxy-polyamide resins, saturated polyester resins, and urea-formaldehyde resins; mixtures of high-molecular weight polyester resins and isocyanate prepolymers, mixtures of methacrylate copolymers and diisocyanate prepolymers, mixtures of polyester polyols and polyisocyanates, mixtures of low-molecular weight glycol/ high-molecular weight diol/polyphenylmethane triisocyanate, etc.; mixtures of the above-mentioned condensation polymerization type resins and crosslinking agents in the form of isocyanate compounds, mixtures of cellulosic resins such as nitrocellulose and cellulose acetobutyrate and crosslinking agents, and mixtures of synthetic rubber such as butadiene-acrylonitrile and crosslinking agents, as well as mixtures of the foregoing components. Especially preferred are mixtures of an epoxy resin and a phenolic resin, mixtures of an epoxy resin, polyvinyl methyl ether and methylol phenol ether as disclosed in U.S. Pat. No. 3,058,544, mixtures of a bisphenol-A type epoxy resin and an acrylate or methacrylate polymer as disclosed in JP-A 131101/1974, a poly-para-vinylphenol resin, and mixtures of a poly-para-vinylphenol resin and an epoxy resin.

Examples of the radiation-curable resin include thermoplastic resins having contained or incorporated in their molecule a group which undergoes crosslinking or polymerization upon exposure to radiation, such as, for example, acrylic double bonds as given by acrylic acid, methacrylic acid and esters thereof having an unsaturated double bond capable of radical polymerization, allyl double bonds as given by diacryl phthalate, and unsaturated bonds as given by maleic acid and maleic acid derivatives. Also useful are compounds having an unsaturated double bond which undergoes crosslinking polymerization upon exposure to radiation and compounds which generate radicals for crosslinking upon exposure to radiation.

Preferred resins which are used as the radiation-curable binder are those resins having an unsaturated double bond as mentioned above in their molecular chain or at their terminal or side chain, typically saturated or unsaturated polyester resins, polyurethane resins, vinyl chloride resins, polyvinyl alcohol resins, polyvinyl butyral resins, epoxy resins, phenoxy resins, cellulosic resins, acrylonitrile-butadiene copolymers, and polybutadiene.

In the practice of the present invention, the radiation-curable compounds may be used in oligomer or monomer form. Examples include mono- or polyfunctional triazine acrylates, pentaerythritol acrylates, ester acrylates, urethane acrylates as well as similar mono- or polyfunctional methacrylates.

The binder may be present in the magnetic coating composition in any desired amount, preferably about 10 to 50 parts by weight per 100 parts by weight of the magnetic powder.

No particular limit is imposed on the solvent used herein. A choice may be made in accordance with a particular purpose among ketones such as methyl ethyl ketone, cyclohexanone, and isophorone, alcohols such as isopropyl alcohol and butyl alcohol, cellosolves such as ethyl cellosolve and cellosolve acetate, and aromatic solvents such as toluene. The solvent may be present in the magnetic coating composition in any desired amount, preferably about 400 to 700 parts by weight per 100 parts by weight of the magnetic powder.

Additionally the magnetic layer may contain non-magnetic inorganic submicron particles. Examples of the non-magnetic inorganic material which forms such particles include metal oxides such as $\alpha$-$Al_2O_3$, $\alpha$-$Fe_2O_3$, $Cr_2O_3$, $TiO_2$, and $SiO_2$; carbon black, graphite and fluorinated graphite; and carbides, nitrides and sulfides such as SiC, SiN, ZnS, and $MnS_2$. The non-magnetic inorganic submicron particles is preferably contained in the magnetic layer in an amount of about 1 to 5 parts by weight per 100 parts by weight of the magnetic powder. Less than 1 part of the inorganic particles are ineffective for its purposes of reducing the wear of the magnetic layer by contact with the head and the coefficient of friction during operation and improving the reliability of the magnetic layer. Magnetic layers containing more than 5 parts of the inorganic particles are inferior in surface roughness and reduced in S/N or C/N ratio, which prevents an increase of recording density and rather allows more errors to occur.

A dispersant may be present in the magnetic layer. Exemplary dispersants are coupling agents such as silane coupling agents and titanium coupling agents; fatty acids such as stearic acid, behenic acid, oleic acid, and linoleic acid; anionic surfactants such as sulfonic acid, phosphoric acid, sulfates and phosphates; nonionic surfactants such as alkylene oxides, glycerins and glycidols; cationic surfactants such as higher alkyl amines, quaternary ammonium salts, pyridine and other heterocyclics, phosphonium and sulfonium salts; and ampholytic surfactants such as amino acids, aminosulfonic acids, sulfates and phosphates of aminoalcohols.

A lubricant may be present in the magnetic layer. Exemplary lubricants are fatty acids such as stearic acid, behenic acid, oleic acid, and linoleic acid; fatty acid esters such as butyl stearate and oleyl oleate; alkali and alkaline earth metal salts of fatty acids such as sodium stearate and sodium oleate; fluoride oils such as perfluoropolyether; silicone oils, fluoro-resins, paraffins, graphites, and molybdenum disulfide.

The magnetic recording medium of the invention is prepared by a conventional process, typically by mixing magnetic powder with binder, organic solvent, and various additives in suitable dispersion means such as ball mills, super sand mills, pressure kneaders, to form a magnetic paint or coating composition.

In the case of flexible media such as magnetic tapes and floppy disks, the magnetic paint is applied to a substrate, for example, polyester film by any conventional technique such as gravure coating, reverse roll coating, nozzle coating and blade coating techniques. The coating is subject to orienting treatment under a DC or AC magnetic field and then dried.

For the orienting treatment, magnetic fields associated with permanent magnets as well as magnetic fields associated with DC and AC driven solenoids may be used. The magnetic field used herein contains a parallel component, a perpendicular component or a combination of parallel and perpendicular components with respect to the magnetic coating. For example, magnetic fields of parallel and perpendicular components with respect to the magnetic coating may be alternately applied to the magnetic coating. For increasing the squareness ratio of the magnetic layer, it is preferred to use in-oven orienting treatment wherein the coating is dried with the orienting magnetic field applied thereto. The orienting magnetic field preferably has a strength of about 2,000 to 10,000 G. Mechanical orienting treatment may be combined with the orienting magnetic field, if desired.

Thereafter, the magnetic coating is smoothed on the surface by means of calender rolls or the like and then cured. If the binder is a thermosetting resin, temperature and time conditions for heat treatment may be suitably determined in accordance with a particular type of binder. For flexible media, curing is done at temperature below the softening point of the substrate. Typically, the coating is cured at a temperature of about 50° to 80° C. for about 24 to 48 hours. If the binder is a radiation-curable resin, curing typically uses room temperature and a dose of about 3 to 10 Mrad. If desired, the medium may be provided with an undercoat, topcoat and backcoat.

In the case of rigid media such as hard disks, the magnetic paint is applied to the surface of a substrate of aluminum alloy which has been smoothed by polishing. To this end any desired coating technique such as spin coating, spraying and dipping may be used.

For spin coating, the number of revolutions and time may be suitably determined in accordance with the desired thickness of the magnetic layer. Preferably the number of revolutions is about 1,000 rpm or higher, more preferably about 2,000 to 10,000 rpm at the time of spinning off. A lower rotational speed would be difficult to form the magnetic layer to a thickness of 0.5 µm or less. The spinning time is preferably 2 seconds or longer, more preferably 5 to 30 seconds. A shorter spinning time would be difficult to form the magnetic layer to a thickness of 0.5 µm or less. With a too long spinning time, the coating surface is dried especially around the disk inner periphery with the result that no satisfactory leveling effect is expected and magnetic particles are ineffectively oriented. The magnetic paint preferably has a viscosity of about 10 to 1,000 centipoise at the spinning off stage while a magnetic field may be applied thereto.

After the magnetic paint is applied to the substrate, the substrate is preferably rotated in solvent vapor and under an applied magnetic field for leveling the coating. It is understood that spin coating and leveling devices may be combined into one wherein spin coating and leveling are done in solvent vapor.

In the orienting step, a magnetic field may be applied by any desired technique. For example, a magnetic field is applied in the direction of recording tracks during the in-plane orienting step by providing a pair of orienting magnets so that the magnetic coating is interposed between opposed poles of the same polarity, and rotating the substrate between the magnets. A perpendicular magnetic field may be applied along with the in-plane directed magnetic field, if desired. Alternatively, a magnetic field is applied in a direction perpendicular to the magnetic layer during the perpendicular orienting step by providing a pair of orienting magnets so that the magnetic coating is interposed between opposed poles of opposite polarity, and rotating the substrate between the magnets.

For the orienting treatment, preferably the orienting magnet creates a magnetic field of about 1,000 to 10,000 G as measured within the coating, the substrate is rotated at about 100 to 500 rpm, and the orienting time is about 10 seconds to 10 minutes. In the orienting atmosphere, the above-mentioned solvent vapor may be either present or absent.

Thereafter, curing treatment is effected for curing the magnetic paint. If the binder is a thermosetting resin, temperature and time conditions for heat treatment may be suitably determined in accordance with a particular type of binder. Typically, the coating is cured at a temperature of about 150° to 300° C. for about 1 to 5 hours. If the binder is a radiation-curable resin, curing typically uses room temperature and a dose of about 3 to 10 Mrad. The curing treatment favors an inert gas atmosphere, especially nitrogen gas atmosphere. At the end of curing, the magnetic coating or layer has a thickness of 0.5 μm or less, preferably less than 0.3 μm.

After curing of the magnetic paint, the magnetic layer is preferably polished on the surface, for example, using various abrasives, typically abrasive tape. This polishing can not only bring the surface roughness of the magnetic layer to a desired value, but also adjust its thickness if desired.

Preferably after the magnetic layer is polished, liquid lubricant is applied to the surface of the magnetic layer whereby the layer is impregnated with the lubricant. Any desired liquid lubricant may be used, with those liquid lubricants containing fluorine-bearing organic compounds being preferred. Any desired technique may be employed to apply the liquid lubricant, for example, dipping and spin coating techniques.

Impregnation of liquid lubricant is followed by banishing for further improving the smoothness of the magnetic disk surface. It is to be noted that the liquid lubricant may be contained in the magnetic paint from the first.

Second form

The magnetic recording medium used herein includes a non-magnetic substrate and a magnetic layer containing a hexagonal ferrite magnetic material. The magnetic layer has a squareness ratio ($S\perp$) of 0.70 to 1 as measured in a direction perpendicular to the recording surface thereof.

As disclosed in JP-B 49656/1987, it was believed that conventional inductive ring heads provide satisfactory recording/reproducing operation without waveform distortion when operated in combination with magnetic recording media having a squareness ratio ($S\perp$) of 0.3 to 0.7 as measured in a direction perpendicular to the recording surface thereof. Also currently used floppy disks utilizing barium ferrite magnetic powder have a squareness ratio ($S\perp$) of about 0.5 to 0.6 as measured in a direction perpendicular to the recording surface thereof so that they can be recorded and reproduced via ring heads.

However, if MR heads are used as the reproducing head for recording and reproducing on magnetic recording media having a squareness ratio of 0.5 or more in a perpendicular direction, the output waveform is distorted and no satisfactory recording/reproducing characteristics are available. This is probably because the MR reproducing heads are more sensitive to a component magnetized perpendicular to the direction of movement relative to the head than inductive ring heads. Where single magnetic pole type heads are used as the recording/reproducing head, reproduction output and overwrite ability are insufficient. Remedy requires a soft magnetic layer underlying the magnetic layer.

However, by using an MR head as the reproducing head and processing output signals without passing through a differential circuit, the influence of a perpendicular remanence component to distort the waveform is avoided. This cooperates with a squareness ratio of at least 0.7 in the perpendicular direction to bring critical improvements in linear recording density and overwrite ability. If the squareness ratio is less than 0.7, the influence of a remanence component in an in-plane direction would exacerbate the symmetry of reproduction wave and recording/reproducing characteristics. Linear recording density and overwrite ability also become poor.

Further, the magnetic layer has a thickness of up to 0.5 μm. This limitation eliminates the problems of magnetic layers thicker than 0.5 μm that no satisfactory overwrite characteristics are available, saturation recording is difficult especially in short wavelength recording, and thickness loss is increased to restrain high-density recording. The lower limit of the magnetic layer thickness is not critical although the lower limit of 0.05 μm is preferred in order to ensure satisfactory reproduction output and S/N ratio. The magnetic layer is preferably 0.08 μm to 0.3 μm thick.

Desirably the magnetic layer has a surface roughness reduced to 5 nm or less down to the detection limit, the surface roughness Ra being defined by JIS B 0601. Ra values of up to 5 nm are effective for removing noise from the medium upon high-density recording so that the S/N and C/N ratios of recording/reproducing operation are fully improved.

In one preferred embodiment, the magnetic layer has a coercivity squarness ratio ($L\perp^*$) of at least 0.9 as measured in a direction perpendicular to the recording surface. Then the medium has a high recording density, high reproduction output and extremely low noise. With a coercivity squareness ratio of less than 0.9, the medium noise would increase and the linear recording density would lower. The coercivity squareness ratio, which does not exceed 1.0 on principle, preferably ranges from 0.9 to 1.0 and is more preferably as approximate to 1.0 as possible.

Also desirably the magnetic layer has a coercivity (Hc) of at least 1,100 Oe as measured in the direction of movement relative to the head. With coercivity below this value, no satisfactory electromagnetic properties are available, high-density recording is difficult, and no high output is obtained upon reproduction. The coercivity of the magnetic layer is selected, while taking into account the performance of the magnetic head to be combined therewith, such that satisfactory overwrite characteristics may be available. The upper limit of coercivity is preferably 2,000 Oe though not critical. More preferably the magnetic layer has a coercivity in the range of 1,400 to 2,000 Oe.

No particular limit is imposed on the hexagonal ferrite ferromagnetic material used herein insofar as the above-mentioned magnetic properties are obtained. Preferred hexagonal ferrite materials are oxides like barium ferrite and strontium ferrite. Examples of the barium ferrite include hexagonal barium ferrites such as $BaFe_{12}O_{19}$ and substituted barium ferrites in which Ba and Fe are partially substituted by at least one metal selected from the group consisting of Ca, Sr, Pb, Co, Ni, Ti, Cr, Zn, In, Mn, Cu, Ge, Nb, Zr, and Sn. Examples of the strontium ferrite include hexagonal strontium ferrites such as $SrFe_{12}O_{19}$ and similarly substituted strontium ferrites.

The magnetic layer is not particularly limited in shape or form although preferred are thin film magnetic layers in which crystal grains are collected together to form a thin film and coated magnetic layers in which ferromagnetic submicron particles are bound in a binder.

The thin film type magnetic layers are generally formed by a sputtering technique using a ferrite material of the above-mentioned composition as the target or by another film deposition technique such as a sol-gel technique.

In the case of coated magnetic layers, hexagonal ferrite submicron particles of the above-mentioned composition are mixed with a binder to form a magnetic coating composition. Also useful is hexagonal ferrite which is modified on the surface with spinel type ferrite in order to provide an increased magnetization quantity and improved temperature coefficient. Further useful are ferrite particles having a coating of oxide or organic compound formed on the surface in order to improve weatherability and dispersion.

The hexagonal ferrite submicron particles have a size which may be determined in accordance with the particular construction of the intended magnetic layer. From the standpoint of electromagnetic properties, the hexagonal ferrite submicron particles preferably have a mean particle size of up to 0.15 μm, more preferably 0.02 to 0.10 μm and a flakiness of at least 2, more preferably about 3 to 10.

It is understood that hexagonal ferrite submicron particles are prepared by any of conventional methods including ceramic, co-precipitation/firing, hydrothermal synthesis, flux, glass crystallization, alkoxide, and plasma jet methods. For these methods, reference is made to Koike and Kubo, Ceramics, Vol. 18, No. 10 (1983).

With respect to the remaining factors associated with the coated magnetic layer including components of the magnetic coating composition (binders, solvents, additives, etc.) and preparation of flexible and rigid media (coating, orientation, smoothing, curing, etc.), reference is made to the discussion given in the first form.

Magnetic head

Next, the thin film type magnetic head used in the magnetic recording/reproducing method of the invention is described in detail. The head is common in the first and second forms of the invention.

The thin film type magnetic head used herein includes a recording ring head and a reproducing MR head. The recording ring head has a gap. At least a portion of the recording head which is disposed adjacent the gap is formed of a soft magnetic material having a saturation magnetic flux density of at least 0.7 T, preferably from 0.7 to about 4 T. The head preferably has an inductance of up to 2 μH. The lower limit of inductance is about 0.1 μH. The reproducing head is formed of a soft magnetic material having magnetoresistance (MR) effect. The thin film type magnetic head has many advantages including high-density recording and high-speed data transfer.

Referring to FIG. 1, there is illustrated one preferred embodiment of the thin film type magnetic head H used herein. The head shown in FIG. 1 includes a slider 1, an insulating underlay layer 2, and a lower shield layer 3 stacked in this order. An MR element 4 is formed on the lower shield layer 3 while it is buried in a gap insulating layer 5. An upper shield layer 6 is formed on the gap insulating layer 5. An MR head section HmR for reproducing is constructed by the lower shield layer 3, MR element 4, gap insulating layer 5, and upper shield layer 6.

Formed on the MR head section HmR are an insulating layer 7 and a lower magnetic layer 8. A coil conductor 10 (turns thereof are shown) is formed thereon while it is buried in an insulating gap layer 9. Formed on the insulating gap layer 9 are an upper magnetic layer 11 and a protective layer 12. An inductive head section HIn for recording is constructed by these components.

In the practice of the invention, the slider 1 is formed of any desired one of conventional well-known materials, for example, ceramics and ferrite. Preferred are ceramics, especially ceramic materials based on $Al_2O_3$—TiC, ceramic materials based on $ZrO_2$, ceramic materials based on SiC, and ceramic materials based on AlN. These ceramic materials may further contain Mg, Y, $ZrO_2$, $TiO_2$, etc. as additives. The slider 1 may have any desired shape, size and other parameters which are selected from known ones in accordance with a particular application.

For the insulating underlay layer 2, any of well-known materials is useful. For example, $SiO_2$, glass, $Al_2O_3$ or the like may be used when it is desired to form such a thin film by sputtering.

For the lower shield layer 3, any of well-known materials is useful. Ni—Fe system alloys as typified by Permalloy are preferred and they are deposited by sputtering or plating technique.

The MR element 4 is formed by depositing the lower gap insulating layer 5 on the lower shield layer 3 by sputtering or the like and depositing an MR film by sputtering or the like, followed by patterning. Leads (not shown) of copper or similar conductor are connected to the MR element 4 as by plating. If necessary, a shunt layer and a soft film bias layer are formed by sputtering or the like for biasing the MR element 4. The MR element 4 is constructed of any of materials having large magnetoresistance effect, preferably Ni—Fe system alloys such as Permalloy. The gap insulating layer 5 is formed of $SiO_2$, $Al_2O_3$ or the like.

For the upper shield layer 6, any of conventional well-known materials may be used. Preferred are Ni—Fe system alloys such as Permalloy, which are deposited by sputtering, plating or the like.

For the insulating layer 7, any of conventional well-known materials is useful. For example, $SiO_2$, glass, $Al_2O_3$ or the like may be used when it is desired to form such a thin film by sputtering. The insulating layer 7 is as conventional with respect to thickness and pattern. For example, it is about 5 to 40 μm thick.

The magnetic layer is provided as the lower and upper magnetic pole layers 8 and 11 as shown in the figure. According to the present invention, the lower and upper magnetic pole layers 8 and 11 are soft magnetic thin films having a saturation magnetic flux density of at least 0.7 T. The soft magnetic material of which these magnetic pole layers are formed is not particularly limited. A preferred choice is made among Fe—Al—Si system alloys such as Sendust, Fe—Al—Si—Ni system alloys such as Super Sendust, Fe—Si system alloys, Ni—Fe system alloys such as Permalloy, and Fe—N system alloys. For each soft magnetic thin film, a structure of multiple strata of such Fe system alloys is acceptable. The lower and upper magnetic pole layers 8 and 11 may be either identical or different in composition. Further, the lower and upper magnetic pole layers 8 and 11 are as conventional with respect to their pattern and thickness. For example, the magnetic pole layer is about 1 to 5 μm thick.

For the gap layer 9, any of conventional well-known materials such as $SiO_2$ and $Al_2O_3$ is useful. The gap layer 9 is as conventional with respect to its pattern and thickness. For example, it is about 0.2 to 1.0 μm thick.

The coil layer 10 may be made any desired material, for example, commonly used metals such as Al and Cu. No limit is imposed on the winding pattern and density of the coil which may be selected from well-known ones. For example, the winding pattern is illustrated as spiral in the figure although laminate and zigzag patterns are also acceptable. For forming the coil layer 10, any of deposition techniques including sputtering, plating and evaporation may be used.

In the illustrated embodiment, the coil layer 10 is of conventional spiral pattern wherein it is spirally extended between the lower and upper magnetic pole layers 8 and 11 and insulated therefrom by the insulating layer 9.

For the protective layer 12, any of conventional well-known materials is useful. The protective layer 12 is as conventional with respect to its pattern and thickness. For example, it is about 10 to 50 μm thick.

If desired, a coating of any desired resin may be disposed at the top of the illustrated structure.

The thin film type magnetic head is manufactured by a process including thin film forming steps and patterning steps. In forming thin films for the respective layers, any of conventional well-known gas phase deposition techniques, for example, vacuum evaporation and sputtering may be used as well as plating. For patterning of these thin films, any of conventional well-known techniques, for example, selective etching and selective deposition may be used. Etching can be either wet or dry etching.

The thin film type magnetic head described above is used in assembly with an arm and other members. The head can be designed to provide any desired flying distance by adjusting the shape of the slider, the loads of gimbal and suspension, the number of revolutions of the magnetic disk, and the like.

Figure 5:
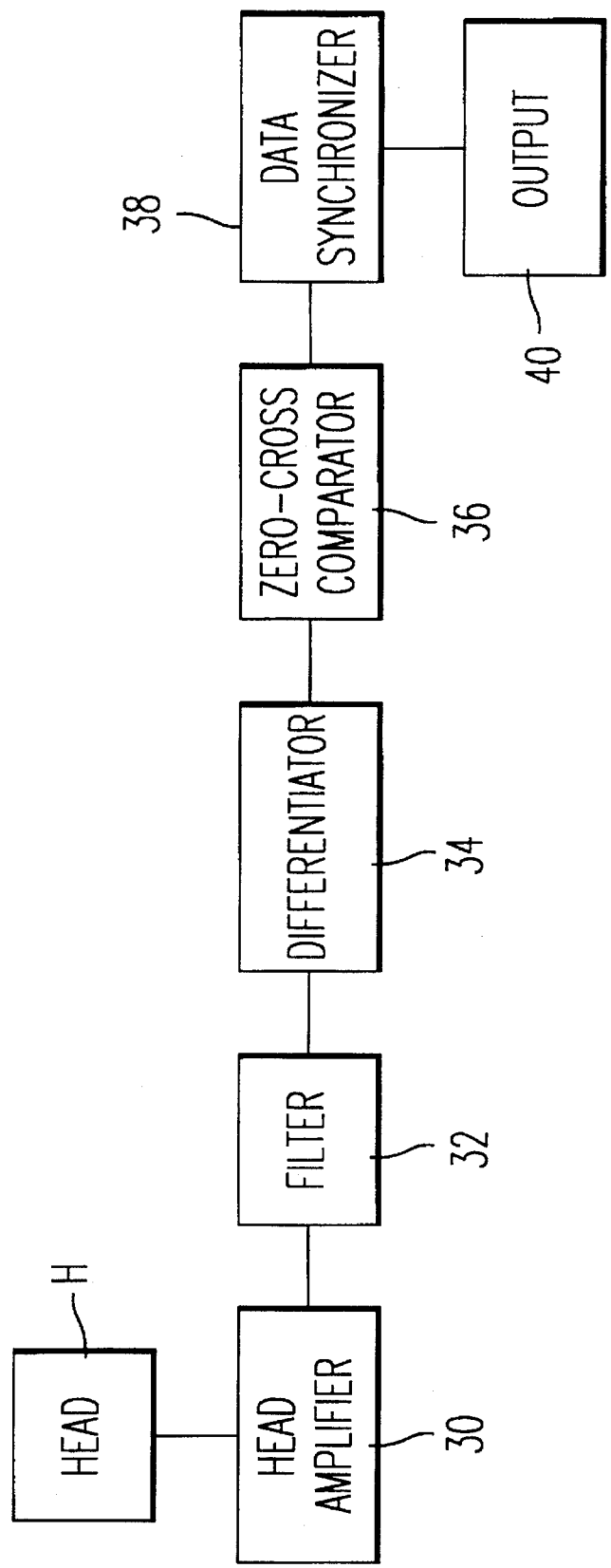
FIG. 5 is a block diagram of a read circuit connected to the read head.

FIG. 5 is a block diagram of a read circuit following the read head which is operated in combination with a magnetic recording medium. The circuit includes the head H, a head amplifier 30, a filter 32, a differentiator 34, a zero-cross comparator 36, a data synchronizer 38, and an output 40 electrically connected in the described order. According to the second form of the present invention, the differentiator is omitted from this circuit.

EXAMPLE

Examples of the present invention are given below by way of illustration and not by way of limitation.

Example 1

Preparation of coated magnetic disks

Magnetic disks designated E, F, G, H, I, J, K, L, M, N, and P were prepared using different magnetic layers.

The following magnetic powders were used for the respective magnetic disks.

| Magnetic disk | Magnetic powder | |
|---|---|---|
| | Composition | Coercivity (Oe) |
| E | Ba ferrite | 700 |
| F | Ba ferrite | 1000 |
| G | Ba ferrite | 1300 |
| H, I, J, K, L, M | Ba ferrite | 1750 |
| N | α-Fe | 1800 |
| P | Co-γ-$Fe_2O_3$ | 770 |

Using these magnetic powders, magnetic coating compositions of the following formulation were prepared.

| Magnetic paint | Parts by weight |
|---|---|
| Magnetic powder | 100 |
| α-$Al_2O_3$ | 3 |
| Polyvinyl phenol resin (Marukalinka ® S2P, Maruzen Petroleum Chemical K.K.) | 8 |
| Epoxy resin (Epikoat ® 1004, Shell Chemical K.K.) | 8 |
| Phosphate ester (Phospharol ® 610E) | 7 |
| Cyclohexanone/isophorone (1/1 mix solvent) | 325 |

The components were mixed and dispersed in a ball mill for 140 hours to give a magnetic coating composition having a viscosity of 150 to 900 centipoise.

The magnetic coating compositions were applied to either surface of disk-shaped aluminum substrates of 3.5 inch diameter by spin coating. The aluminum substrates had a surface roughness Rmax of 0.038 μm. For magnetic disks E, F, G, H, L, M, and P, the compositions were coated at 3,500 to 4,500 rpm at spinning off for 10 to 20 seconds so as to give coatings having an average thickness of 0.30 μm at the end of curing. For magnetic disks K and N, the compositions were coated at 2,500 to 3,500 rpm at spinning off for 10 to 20 seconds so as to give coatings having an average thickness of 0.40 μm at the end of curing. For magnetic disks I and J, the compositions were coated at 1,500 to 2,500 rpm at spinning off for 5 to 10 seconds so as to give coatings having an average thickness of 0.60 μm and 1.0 μm at the end of curing, respectively.

In an atmosphere of air with cyclohexanone vapor, each coated disk was rotated across a leveling device consisting of N—S opposed rod-shaped magnets at room temperature (23° C.) for leveling the coating.

Next, the coated disks except for disk M were subject to orienting treatment in a disk circumferential direction through an orienting device consisting of opposed magnets and then the coatings were dried. The orienting magnetic field had an intensity of 1,000 G for disk L and 2,000 to 40,000 G for the remaining disks, as measured in the coatings, which corresponded twice or more the coercivity of the magnetic powder used. During the orienting treatment, the disks were rotated at 200 rpm and the orienting time was 45 seconds.

The coatings were cured by heating at 200° C. for 3 hours in a nitrogen stream. The coatings were polished using a tape polishing machine with abrasive tape WA 6000 or WA 8000 (commercially available from Nippon Micro-Coating K.K.) for fine thickness adjustment and smoothing of the magnetic layer.

Next, the disks were cleaned and coated with a flon solution of fluorocarbon (Fomblin AM2001, Montecatini) at 0.1% concentration by dipping whereupon the coatings were impregnated with the fluorocarbon. In this way, the coated magnetic disks were completed.

Preparation of thin film type magnetic disks

Thin film type magnetic disks Q, R, and S were prepared which had magnetic layers with different coercivity.

First, a disk-shaped aluminum substrate of 3.5 inch diameter was formed with an Ni-P undercoat layer of 20 μm thick by electroless plating and surface smoothed by means of an abrasive polishing machine.

On the undercoat layer, a chromium layer of 0.2 μm thick was deposited by means of a magnetron sputtering device, and a magnetic layer of Co—Ni—Cr or Co—Ni—Ta alloy was then deposited to a thickness of 0.05 μm. The magnetic layer of Co—Ni—Ta alloy was changed in coercivity by adjusting the substrate heating condition and Ar gas pressure.

On the magnetic layer, a carbon protective film of 0.04 μm thick was deposited by RF magnetron sputtering. The flon solution of fluorocarbon was applied to the protective film to form a protective lubricating film. In this way, the thin film type magnetic disks were completed.

Preparation of flying thin film type magnetic heads

Inductive/MR composite thin film head

A MR reproducing head section was prepared as shown in FIG. 1 by successively building up the insulating underlay layer 2, lower shield layer 3, MR element 4, gap insulating layer 5 and upper shield layer 6 on the slider 1.

An inductive head section was formed on the MR reproducing head by successively building up the insulating layer 7, lower magnetic layer 8, gap insulating layer 9, coil conductor 10, upper magnetic layer 11, and protective layer 12 thereon. In this way, an inductive MR composite thin film head was manufactured. The respective layers were deposited by sputtering or plating and patterned by dry etching.

The slider 1 used was of $Al_2O_3$—TiC. The insulating layer 2 was of $Al_2O_3$. The lower and upper shield layers 3 and 6 were Permalloy films having a saturation magnetic flux density of 0.8 T formed by a plating technique. The gap layer 5 was of $Al_2O_3$. The MR element 4 was formed by depositing Permalloy on a lower gap insulating layer by sputtering and patterning the deposit by dry etching, whereupon an upper gap insulating layer was deposited thereon to complete the gap insulating layer. The MR element 4 had a thickness of 0.35 μm which corresponded to a gap distance.

The insulating layer 7 was a film of $Al_2O_3$ having a thickness of 30 μm. The lower and upper magnetic layers 8 and 11 were films of Permalloy with a saturation magnetic flux density of 0.8 T which had a thickness of 1.7 μm and 2.0 μm, respectively. They were deposited by magnetron sputtering. The gap insulating layer 9 was of $SiO_2$ and had a gap distance of 0.35 μm. The coil layer 10 was formed by depositing copper in a spiral pattern. The protective film 12 was of $Al_2O_3$ and had a thickness of 40 μm.

Figure 3:
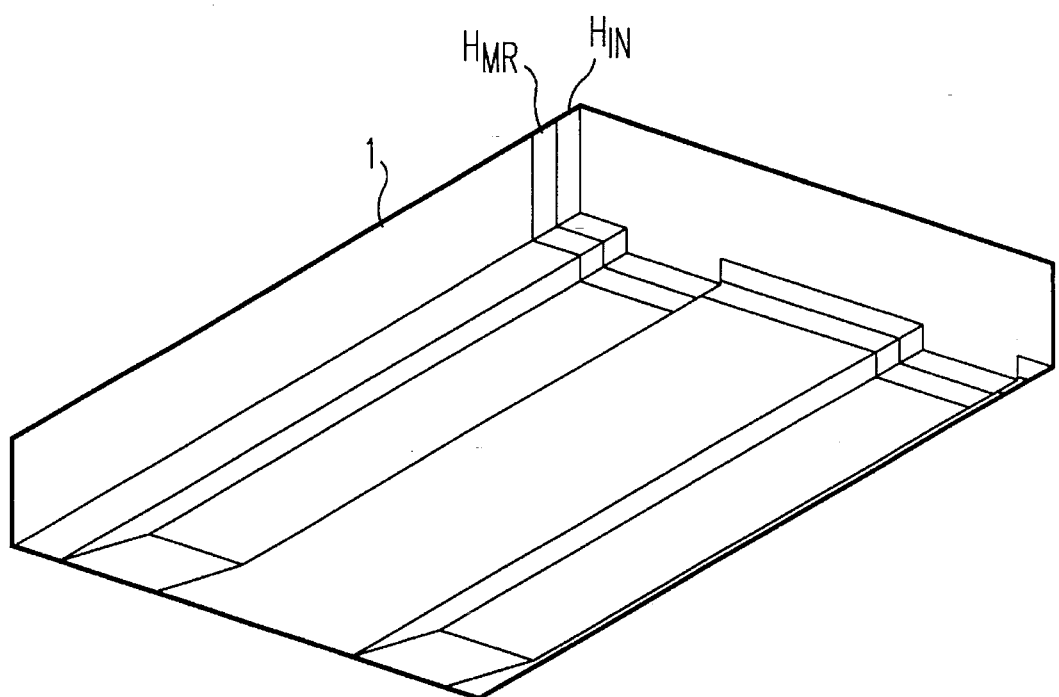
FIG. 3 is a perspective view of a slider block for use with the thin film head of FIG. 1.

A slider block was shaped as shown in FIG. 3 and assembled with a gimbal and an arm to complete a flying magnetic head, which is designated magnetic head A.

Inductive thin film magnetic head

Figure 2:
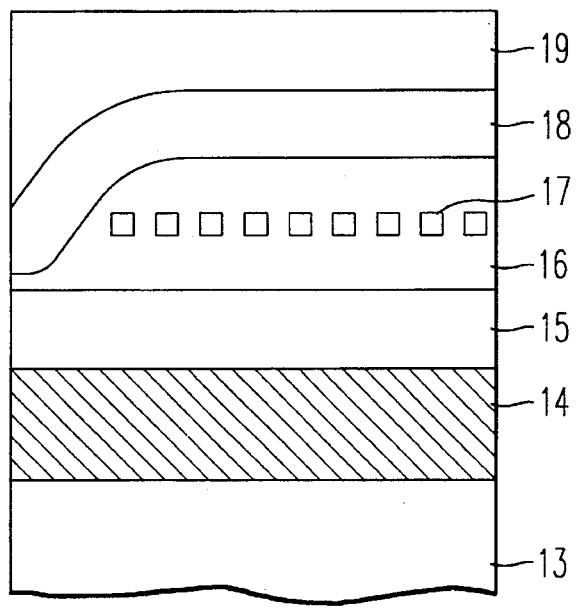
FIG. 2 is a cross-sectional view of one exemplary thin film magnetic head used for comparison purpose.

An inductive thin film type magnetic head was prepared as shown in FIG. 2 by successively building up an insulating layer 14, lower magnetic layer 15, gap insulating layer 16, coil conductor 17, gap insulating layer 16, upper magnetic layer 18, and protective layer 19 on a slider 13. The respective layers were deposited by sputtering and patterned by dry etching.

The slider 13 used was of $Al_2O_3$—TiC. The insulating layer 14 was of $Al_2O_3$ and had a thickness of 30 μm. The lower and upper magnetic layers 15 and 18 were films of Permalloy with a saturation magnetic flux density of 0.8 T which had a thickness of 1.7 μm and 2.0 μm, respectively. They were deposited by magnetron sputtering.

The gap insulating layer 16 was of $SiO_2$ and had a gap distance of 0.65 μm. The coil layer 17 was formed by depositing copper in a spiral pattern. The protective film 19 was of $Al_2O_3$ and had a thickness of 40 μm.

A slider block was shaped as shown in FIG. 3 and assembled with a gimbal and an arm to complete a flying magnetic head, which is designated magnetic head B.

MIG magnetic head and ferrite magnetic head

Figure 4:
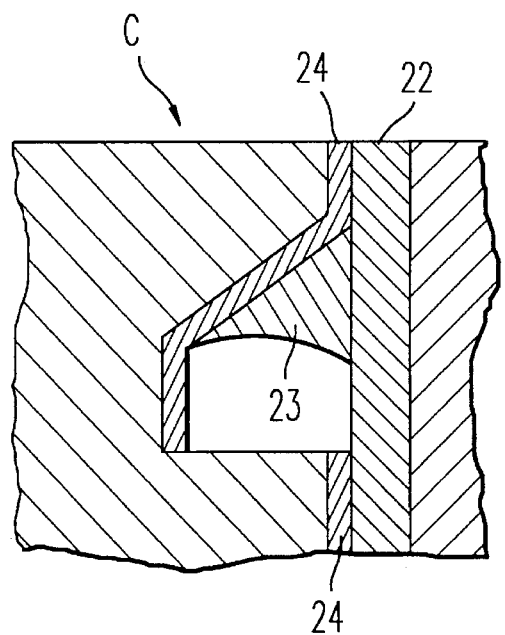
FIG. 4 is a cross-sectional view of one exemplary MIG magnetic head used for comparison purpose.

Referring to FIG. 4, a Mn—Zn sintered ferrite block having a saturation magnetization of 0.36 T was machined to form a V-shaped groove. A Sendust film 22 having a saturation magnetic flux density of 1.1 T and a thickness of 2 μm was formed by magnetron sputtering. After appropriate machining, the ferrite cores are fusion welded with a low-melting glass 23 so as to define a gap 24. The gap was constructed of $SiO_2$ and had a distance of 0.3 μm. A magnetic head core was obtained.

A copper coil was wound 24 turns on the magnetic head core to provide a MIG magnetic head. The head was assembled with a gimbal and an arm to complete a flying magnetic head, which is designated head C.

Like the MIG head, a ferrite magnetic head was prepared by machining a Mn—Zn sintered ferrite block having a saturation magnetization of 0.36 T. This is designated head D.

Test methods

The magnetic layers of the magnetic disk samples were measured for average thickness (t) and surface roughness (Ra). The thickness (t) of the magnetic layer was determined by partially removing the magnetic layer from a disk sample on test and measuring the step between the magnetic layer surface and the magnetic layer-free area by means of a probe type surface roughness meter, Talistep. The surface roughness (Ra) was determined by the method prescribed in JIS B-0601.

The magnetic layers were measured for coercivity (Hc), squareness ratio (S), and coercivity squareness ratio (S*) in the movement direction relative to the head using a vibrating sample magnetometer (VSM) under a maximum applied magnetic field of 10 kG.

The magnetic heads were measured for saturation magnetic flux density (Bs) and inductance (I) in the proximity of the gap. The saturation magnetic flux density (Bs) was measured by means of a VSM after deposition of the magnetic film. The inductance (I) measurement used an impedance analyzer (manufactured by Hughlet Packard).

Magnetic disk drives having the respective flying magnetic heads built therein were loaded with the respective magnetic disks and operated for recording and reproducing signals while the following tests were done. The combination of head and disk is shown in Table 1.

The inductive MR composite thin film magnetic heads used had a recording gap distance of 0.7 μm and a reproducing gap distance of 0.3 μm. During recording/reproducing operation, the head was kept afloat on the rotating disk at a flying distance of 0.13 μm. The flying distance is the distance between the magnetic head surface and the bearing surface of the magnetic head at the gap. The flying distance was measured by rotating a special quartz disk under the same conditions normally employed for other measurements, thereby pneumatically keeping the magnetic head afloat on the disk surface, directing white light to the gap of the head from the rear side of the quartz disk, detecting the interference between the light reflected by the head gap and the light reflected by the disk surface, and calculating the flying distance therefrom.

A recording density D70 was measured by varying the recording frequency. It was determined from the recording frequency at which the peak-to-peak (P—P) value of reproduction output decreased to 70% of the P—P value of solitary wave reproduction output.

Modulation noise was evaluated in terms of a C/N ratio. The C/N ratio was determined by recording signals of 19 MHz, reproducing the signals, and determining the difference between reproduction output at 19 MHz and modulation noise at 6 MHz by means of a spectrum analyzer (manufactured by Hughlet Packard).

Overwrite ability (O/W) was measured by overwriting 2F signals (2.25 MHz) over 1F signals (9 MHz) and measuring the attenuation of the 1F signals by means of a spectrum analyzer (manufactured by Hughlet Packard).

Bit shift (BS) was evaluated by recording the worst pattern (3E1E) at frequency 13.5 MHz in accordance with 1–7 modulation code and measuring the bit shift quantity (BS) at a sampling number of $10^9$ by means of a time interval analyzer (manufactured by ITI).

The results are shown in Table 1.

overwrite ability, but was poor in linear recording density and modulation noise and substantially deteriorated in bit shift.

Combination No. 10 using the magnetic disk having a coated magnetic layer containing α—Fe was poor in modulation noise and deteriorated in bit shift.

Combination No. 11 using the magnetic disk having a coated magnetic layer containing Co—γ—$Fe_2O_3$ was poor in linear recording density and modulation noise and deteriorated in bit shift.

Combination Nos. 12, 13 and 14 using the magnetic disks having the thin film type magnetic layers were acceptable in linear recording density and overwrite ability, but were poor in modulation noise and insufficient in bit shift.

Combination Nos. 15, 16 and 17 using the thin film type magnetic head were poor in modulation noise and bit shift.

Combination Nos. 18, 19 and 20 using the MIG magnetic head were poor in linear recording density and modulation noise and deteriorated in bit shift.

TABLE 1

| Combination No. | Magnetic head | | | Magnetic disk | | | | | Electromagnetic properties | | | |
|---|---|---|---|---|---|---|---|---|---|---|---|---|
| | Type | Bs (T) | I (μH) | Type | t (μm) | Hc (Oe) | S⊥ | S⊥* | D70 (KFCI) | C/N (dB) | O/W (dB) | BS (ns) |
| 1 | A | 0.8 | 1 | F | 0.3 | 3.0 | 1200 | 0.81 | 0.90 | 61 | 48 | −37 | 12.6 |
| 2 | A | 0.8 | 1 | G | 0.3 | 3.2 | 1500 | 0.77 | 0.95 | 63 | 52 | −35 | 12.1 |
| 3 | A | 0.8 | 1 | H | 0.3 | 3.1 | 1800 | 0.75 | 0.92 | 67 | 53 | −32 | 11.9 |
| 4 | A | 0.8 | 1 | I* | 0.6* | 3.1 | 1800 | 0.76 | 0.92 | 55 | 32 | −27 | 17.5 |
| 5 | A | 0.8 | 1 | J* | 1.0* | 3.1 | 1800 | 0.75 | 0.92 | 46 | 29 | −25 | 19.2 |
| 6 | A | 0.8 | 1 | K* | 0.3 | 6.2* | 1800 | 0.75 | 0.92 | 58 | 39 | −29 | 14.5 |
| 7 | A | 0.8 | 1 | L* | 0.3 | 3.1 | 1800 | 0.61* | 0.90 | 67 | 42 | −39 | 21.5 |
| 8 | A | 0.8 | 1 | M* | 0.3 | 3.2 | 1800 | 0.55* | 0.81 | 71 | 43 | −41 | 30.7 |
| 9 | A | 0.8 | 1 | E* | 0.3 | 3.2 | 900* | 0.85 | 0.90 | 55 | 41 | −43 | 14.0 |
| 10 | A | 0.8 | 1 | N* | 0.3 | 3.3 | 1800 | 0.87 | 0.75 | 58 | 33 | −34 | 16.9 |
| 11 | A | 0.8 | 1 | P* | 0.3 | 14.7* | 750* | 0.79 | 0.65 | 31 | 25 | −45 | 23.5 |
| 12 | A | 0.8 | 1 | Q* | 0.05 | 6.5* | 1400 | 0.79 | 0.87 | 51 | 38 | −45 | 17.2 |
| 13 | A | 0.8 | 1 | R* | 0.05 | 6.3* | 1600 | 0.77 | 0.88 | 60 | 41 | −42 | 15.3 |
| 14 | A | 0.8 | 1 | S* | 0.05 | 6.2* | 1800 | 0.81 | 0.87 | 64 | 44 | −41 | 14.7 |
| 15 | B* | 0.8 | 2 | F | 0.3 | 3.0 | 1200 | 0.81 | 0.90 | 62 | 27 | −35 | 20.8 |
| 16 | B* | 0.8 | 2 | G | 0.3 | 3.2 | 1500 | 0.77 | 0.95 | 63 | 27 | −32 | 19.3 |
| 17 | B* | 0.8 | 2 | H | 0.3 | 3.1 | 1800 | 0.75 | 0.92 | 65 | 28 | −28 | 19.1 |
| 18 | C* | 1.1 | 6 | F | 0.3 | 3.0 | 1200 | 0.81 | 0.90 | 45 | 25 | −30 | 23.5 |
| 19 | C* | 1.1 | 6 | G | 0.3 | 3.2 | 1500 | 0.77 | 0.95 | 46 | 25 | −28 | 25.2 |
| 20 | C* | 1.1 | 6 | H | 0.3 | 3.1 | 1800 | 0.75 | 0.92 | 48 | 26 | −28 | 25.1 |
| 21 | D* | 0.36 | 7 | H | 0.3 | 3.1 | 1800 | 0.75 | 0.92 | 45 | 18 | −20 | 37.0 |

*comparison

The effectiveness of the invention is evident from Table 1.

More particularly, combination Nos. 1 to 3 falling within the scope of the invention offered a high linear recording density D70 of 61 KFCI or more, a C/N ratio representing modulation noise of 48 dB or more, an overwrite ability (O/W) of −37 dB or better, and a bit shift (BS) of 12.6 ns or less.

In contrast, combination Nos. 4 and 5 in which the magnetic layers had a thickness in excess of 0.5 μm had a lower linear recording density and were deteriorated in modulation noise and bit shift. Also overwrite ability was insufficient.

Combination No. 6 in which the magnetic layer had a surface roughness (Ra) in excess of 0.5 nm was deteriorated in modulation noise and bit shift.

Combination Nos. 7 and 8 in which the magnetic layers had a squareness ratio (S) of lower than 0.7 were acceptable in linear recording density and overwrite ability, but were substantially deteriorated in bit shift probably because of distortion of reproduction waveform.

Combination No. 9 in which the magnetic layer had a coercivity (Hc) of lower than 1,100 Oe was acceptable in Combination No. 21 using the ferrite magnetic head was poor in linear recording density and modulation noise and deteriorated in overwrite ability and bit shift.

Example 2

Preparation of coated magnetic disks

Magnetic disks designated E', F', G', H', I', J', and K' were prepared using different magnetic layers.

The following magnetic powders were used for the respective magnetic disks.

| | Magnetic powder | |
|---|---|---|
| Magnetic disk | Composition | Coercivity (Oe) |
| E', F', G', H', I' | Ba ferrite | 1750 |
| J' | α-Fe | 1800 |
| K' | Co-γ-$Fe_2O_3$ | 770 |

Using these magnetic powders, magnetic coating compositions of the following formulation were prepared.

| Magnetic paint | Parts by weight |
| --- | --- |
| Magnetic powder | 100 |
| $\alpha$-$Al_2O_3$ | 3 |
| Polyvinyl phenol resin (Marukalinka ® S2P, Maruzen Petroleum Chemical K.K.) | 8 |
| Epoxy resin (Epikoat ® 1004, Shell Chemical K.K.) | 8 |
| Phosphate ester (Phospharol ® 610E) | 7 |
| Cyclohexanone/isophorone (1/1 mix solvent) | 325 |

The components were mixed and dispersed in a ball mill for 140 hours to give a magnetic coating composition having a viscosity of 150 to 900 centipoise.

The magnetic coating compositions were applied to either surface of disk-shaped aluminum substrates of 3.5 inch diameter by spin coating. The aluminum substrates had a surface roughness Rmax of 0.038 μm. For magnetic disks E', F', G', H', I', and K', the compositions were coated at 3,500 to 4,500 rpm at spinning off for 10 to 20 seconds so as to give coatings having an average thickness of 0.30 μm at the end of curing. For magnetic disk J, the composition was coated at 2,500 to 3,500 rpm at spinning off for 10 to 20 seconds so as to give a coating having an average thickness of 0.40 μm at the end of curing.

In an atmosphere of air with cyclohexanone vapor, each coated disk was rotated across a leveling device consisting of N—S opposed rod-shaped magnets at room temperature (23° C.) for leveling the coating.

Next, the coated disks were subject to orienting treatment in a disk circumferential direction through an orienting device consisting of opposed magnets and then the coatings were dried. As to the orienting magnetic field, magnets with opposite poles faced each other created a magnetic field of 1,000 to 7,000 G as measured in the coatings for disks E', F', and G'. Magnets with identical poles faced each other created a magnetic field of 500 to 4,000 G as measured in the coatings for disks H', I', J', and K'. During the orienting treatment, the disks were rotated at 200 rpm and the orienting time was 45 seconds.

The coatings were cured by heating at 200° C. for 3 hours in a nitrogen stream. The coatings were polished using a tape polishing machine with abrasive tape WA 6000 or WA 8000 (commercially available from Nippon Micro-Coating K.K.) for fine thickness adjustment and smoothing of the magnetic layer.

Next, the disks were cleaned and coated with a flon solution of fluorocarbon (Fomblin AM2001, Montecatini) at 0.1% concentration by dipping whereupon the coatings were impregnated with the fluorocarbon. In this way, the coated magnetic disks were completed.

In all these magnetic disks, the magnetic layers were measured for surface roughness (Ra) by the method prescribed in JIS B-0601 to find that they all had Ra of less than 5 nm.

Preparation of thin type magnetic disks

Thin film type magnetic disks L', M', and N' were prepared which had magnetic layers with different coercivity.

First, a disk-shaped aluminum substrate of 3.5 inch diameter was formed with an Ni—P undercoat layer of 20 μm thick by electroless plating and surface smoothed by means of an abrasive polishing machine.

On the undercoat layer, a chromium layer of 0.2 μm thick was deposited by magnetron sputtering, and a magnetic layer of Co—Ni—Cr or Co—Ni—Ta alloy was then deposited to a thickness of 0.05 μm. The magnetic layer of Co—Ni—Ta alloy was changed in coercivity by adjusting the substrate heating condition and Ar gas pressure.

On the magnetic layer, a carbon protective film of 0.04 μm thick was deposited by RF magnetron sputtering. The flon solution of fluorocarbon was applied to the protective film to form a protective lubricating film. In this way, the thin film type magnetic disks were completed.

Preparation of flying thin film type magnetic heads

Inductive/MR thin film magnetic head

A MR reproducing head section was prepared as shown in FIG. 1 by successively building up the insulating underlay layer 2, lower shield layer 3, MR element 4, gap insulating layer 5 and upper shield layer 6 on the slider 1.

An inductive head section was formed on the MR reproducing head by successively building up the insulating layer 7, lower magnetic layer 8, gap insulating layer 9, coil conductor 10, upper magnetic layer 11, and protective layer 12 thereon. In this way, an inductive MR composite thin film head was manufactured. The respective layers were deposited by sputtering or plating and patterned by dry etching.

The slider 1 used was of $Al_2O_3$—TiC. The insulating layer 2 was of $Al_2O_3$. The lower and upper shield layers 3 and 6 were Permalloy films having a saturation magnetic flux density of 0.8 T formed by a plating technique. The gap layer 5 was of $Al_2O_3$. The MR element 4 was formed by depositing Permalloy on a lower gap insulating layer by sputtering and patterning the deposit by dry etching, whereupon an upper gap insulating layer was deposited thereon to complete the gap insulating layer. The MR element 4 had a thickness of 0.35 μm which corresponded to a gap distance.

The insulating layer 7 was a film of $Al_2O_3$ having a thickness of 30 μm. The lower and upper magnetic layers 8 and 11 were films of Permalloy with a saturation magnetic flux density of 0.8 T which had a thickness of 1.7 μm and 2.0 μm, respectively. They were deposited by magnetron sputtering. The gap insulating layer 9 was of $SiO_2$ and had a gap distance of 0.35 μm. The coil layer 10 was formed by depositing copper in a spiral pattern. The protective film 12 was of $Al_2O_3$ and had a thickness of 40 μm.

A slider block was shaped as shown in FIG. 3 and assembled with a gimbal and an arm to complete a flying magnetic head, which is designated magnetic head A.

Inductive thin film magnetic head

An inductive thin film type magnetic head was prepared as shown in FIG. 2 by successively building up an insulating layer 14, lower magnetic layer 15, gap insulating layer 16, coil conductor 17, gap insulating layer 16, upper magnetic layer 18, and protective layer 19 on a slider 13. The respective layers were deposited by sputtering and patterned by dry etching.

The slider 13 used was of $Al_2O_3$—TiC. The insulating layer 14 was of $Al_2O_3$ and had a thickness of 30 μm. The lower and upper magnetic layers 15 and 18 were films of Permalloy with a saturation magnetic flux density of 0.8 T which had a thickness of 1.7 μm and 2.0 μm, respectively. They were deposited by magnetron sputtering.

The gap insulating layer 16 was of $SiO_2$ and had a gap distance of 0.65 μm. The coil layer 17 was formed by depositing copper in a spiral pattern. The protective film 19 was of $Al_2O_3$ and had a thickness of 40 μm.

A slider block was shaped as shown in FIG. 3 and assembled with a gimbal and an arm to complete a flying magnetic head, which is designated magnetic head B.

MIG magnetic head and ferrite magnetic head

Referring to FIG. 4, a Mn—Zn sintered ferrite block having a saturation magnetization of 0.36 T was machined to form a V-shaped groove. A Sendust film 22 having a saturation magnetic flux density of 1.1 T and a thickness of 2 μm was formed by magnetron sputtering. After appropriate machining, the ferrite cores are fusion welded with a low-melting glass 23 so as to define a gap 24. The gap was constructed of $SiO_2$ and had a distance of 0.3 μm. A magnetic head core was obtained.

A copper coil was wound 24 turns on the magnetic head core to provide a MIG magnetic head. The head was assembled with a gimbal and an arm to complete a flying magnetic head, which is designated head C.

Like the MIG head, a ferrite magnetic head was prepared by machining a Mn—Zn sintered ferrite block having a saturation magnetization of 0.36 T. This is designated head D.

Test methods

The magnetic layers of the magnetic disk samples were measured for average thickness (t). The thickness (t) of the magnetic layer was determined by partially removing the magnetic layer from a disk sample on test and measuring the step between the magnetic layer surface and the magnetic layer-free area by means of a probe type surface roughness meter, Talistep.

The magnetic layers were measured for coercivity (Hc) in the direction of movement relative to the head, squareness ratio (S⊥) and coercivity squareness ratio (S⊥*) in a direction perpendicular to the recording surface using a vibrating sample magnetometer (VSM) under a maximum applied magnetic field of 10 kG. The properties in the perpendicular direction were corrected for a diamagnetic field.

The magnetic heads were measured for saturation magnetic flux density (Bs) and inductance (I) in the proximity of the gap. The saturation magnetic flux density (Bs) was measured by means of a VSM after deposition of the magnetic film. The inductance (I) measurement used an impedance analyzer (manufactured by Hughlet Packard).

Magnetic disk drives having the respective flying magnetic heads built therein were loaded with the respective magnetic disks and operated for recording and reproducing signals while the following tests were done. The combination of head and disk is shown in Table 2.

The inductive MR composite thin film magnetic heads used had a recording gap distance of 0.7 μm and a reproducing gap distance of 0.3 μm. During recording/reproducing operation, the head was kept afloat on the rotating disk at a flying distance of 0.13 μm. The flying distance is the distance between the magnetic head surface and the bearing surface of the magnetic head at the gap. The flying distance was measured by rotating a special quartz disk under the same conditions normally employed for other measurements, thereby pneumatically keeping the magnetic head afloat on the disk surface, directing white light to the gap of the head from the rear side of the quartz disk, detecting the interference between the light reflected by the head gap and the light reflected by the disk surface, and calculating the flying distance therefrom.

A recording density D70 was measured by varying the recording frequency. It was determined from the recording frequency at which the peak-to-peak (P—P) value of reproduction output decreased to 70% of the P—P value of solitary wave reproduction output.

Modulation noise was evaluated in terms of a C/N ratio. The C/N ratio was determined by recording signals of 19 MHz, reproducing the signals, and determining the difference between reproduction output at 19 MHz and modulation noise at 6 MHz by means of a spectrum analyzer (manufactured by Hughlet Packard).

Overwrite ability (O/W) was measured by overwriting 2F signals (2.25 MHz) over 1F signals (9 MHz) and measuring the attenuation of the 1F signals by means of a spectrum analyzer (manufactured by Hughlet Packard).

Bit shift (BS) was evaluated by recording the worst pattern (3E1E) at frequency 13.5 MHz in accordance with 1-7 modulation code and measuring the bit shift quantity (BS) at a sampling number of $10^9$ by means of a time interval analyzer (manufactured by ITI). In evaluating the coated media using barium ferrite magnetic particles, a differential circuit was omitted from the measurement system.

The results are shown in Table 2.

TABLE 2

| Combination No. | Magnetic head | | | Magnetic disk | | | | | Electromagnetic properties | | | |
|---|---|---|---|---|---|---|---|---|---|---|---|---|
| | Type | Bs (T) | I (μH) | Type | t (μm) | Hc (Oe) | S⊥ | S⊥* | D70 (KFCI) | C/N (dB) | O/W (dB) | BS (ns) |
| 101 | A | 0.8 | 1 | E' | 0.3 | 1500 | 0.72 | 0.93 | 77 | 45 | −41 | 10.2 |
| 102 | A | 0.8 | 1 | F' | 0.3 | 1450 | 0.75 | 0.95 | 77 | 48 | −45 | 9.5 |
| 103 | A | 0.8 | 1 | G' | 0.3 | 1410 | 0.81 | 0.95 | 79 | 49 | −46 | 9.1 |
| 104 | A | 0.8 | 1 | H'* | 0.3 | 1800 | 0.37* | 0.83* | 67 | 53 | −32 | >30.0 |
| 105 | A | 0.8 | 1 | I'* | 0.3 | 1750 | 0.52* | 0.85* | 69 | 50 | −35 | 20.2 |
| 106 | A | 0.8 | 1 | J'* | 0.3 | 1800 | 0.31* | 0.62* | 58 | 33 | −34 | 16.9 |
| 107 | A | 0.8 | 1 | K'* | 0.3 | 750 | 0.34* | 0.59* | 31 | 25 | −45 | 23.5 |
| 108 | A | 0.8 | 1 | L'* | 0.05 | 1400 | 0.23* | 0.71* | 51 | 38 | −45 | 17.2 |
| 109 | A | 0.8 | 1 | M'* | 0.05 | 1600 | 0.21* | 0.75* | 60 | 41 | −42 | 15.3 |
| 110 | A | 0.8 | 1 | N'* | 0.05 | 1800 | 0.23* | 0.77* | 64 | 44 | −41 | 14.7 |
| 111 | B* | 0.8 | 2 | F' | 0.3 | 1450 | 0.75 | 0.95 | 69 | 27 | −33 | >30.0 |
| 112 | C* | 1.1 | 6 | F' | 0.3 | 1450 | 0.75 | 0.95 | 53 | 24 | −31 | >30.0 |
| 113 | D* | 0.36 | 7 | F' | 0.3 | 1450 | 0.75 | 0.95 | 50 | 16 | −23 | >30.0 |

*comparison

The effectiveness of the invention is evident from Table 2.

More particularly, combination Nos. 101 to 103 falling within the scope of the invention offered a high linear recording density D70 of 77 KFCI or more, a C/N ratio representing modulation noise of 45 dB or more, an overwrite ability (O/W) of −41 dB or more negative, and a bit shift (BS) of 9.1 ns or less.

In contrast, combination Nos. 104 and 105 in which the magnetic layers had a squareness ratio (S⊥) of lower than 0.7 and a coercivity squareness ratio (S⊥*) of lower than 0.9 in a direction perpendicular to the recording surface of the layers were acceptable in modulation noise, but deteriorated in overwrite ability and bit shift.

Combination Nos. 106 and 107 using the magnetic disks having a coated magnetic layer containing α—Fe or Co—γ—Fe$_2$O$_3$ was poor in linear recording density and modulation noise. Although a conventional circuit was used in the evaluation of bit shift, the bit shift was unsatisfactory.

Combination Nos. 108, 109 and 110 using the magnetic disks having a thin film type magnetic layer were poor in linear recording density. Although a conventional circuit was used in the evaluation of bit shift, the bit shift was unsatisfactory.

Combination No. 111 using the thin film magnetic head were acceptable in linear recording density, but poor in modulation noise, overwrite and bit shift.

Combination Nos. 112 and 113 using the MIG magnetic head and ferrite magnetic head were poor in linear recording density, modulation noise, overwrite and bit shift.

Apart from the foregoing examples, similar benefits were observed for magnetic tapes and floppy disks using flexible substrates. The invention is applicable to medium and head in any form.

It is thus evident that the present invention provides a reliable magnetic recording/reproducing method capable of high-density recording at low cost.

Japanese Patent Application Nos. 152972/1993 and 152973/1993 are incorporated herein by reference.

While this invention has been described with respect to a preferred embodiment, it will be understood by those skilled in the art that various changes and modifications may be made without departing from the spirit and scope of the invention.

We claim:

1. A method for magnetically recording and reproducing signals in and from a magnetic recording medium via a thin film type magnetic head, said magnetic recording medium comprising a non-magnetic substrate and a magnetic layer formed thereon by coating a composition containing hexagonal ferromagnetic submicron particles and a binder, wherein said magnetic layer has a thickness of 0.05–0.5 μm, a surface roughness (Ra) of up 5 nm, and a coercivity (Hc) of 1,100–2000 Oe and a squareness ratio (S) of 0.70–1 as measured in the direction of movement relative to the head, and said magnetic head includes a recording head in which at least a portion thereof disposed adjacent a gap is formed of a soft magnetic material having a saturation magnetic flux density of 0.7–4, a reproducing head which is formed of a soft magnetic material having magnetoresistance effect buried in a gap insulating layer, and an insulating layer between the recording head and the reproducing head.

2. The magnetic recording and reproducing method of claim 1 wherein said hexagonal ferromagnetic submicron particles are barium ferrite submicron particles and said magnetic layer has a coercivity squareness ratio (S*) of at least 0.80–1 as measured in the direction of movement relative to the head.

3. The magnetic recording and reproducing method of claim 1 or 2 wherein said head has an inductance of 0.1 2 μH.

4. A method for magnetically recording and reproducing signals in and from a magnetic recording medium via a thin film type magnetic head, said magnetic recording medium comprising a non-magnetic substrate and a magnetic layer containing a hexagonal ferrite magnetic material, wherein said magnetic layer has a thickness of 0.05–0.5 μm, and a squareness ratio (S$^\perp$) of 0.70–1 as measured in a direction perpendicular to the recording surface thereof, said magnetic head includes a recording head in which at least a portion thereof disposed adjacent a gap is formed of a soft magnetic material having a saturation magnetic flux density of 0.7–4 T, a reproducing head which is formed of a soft magnetic material having magnetoresistance effect buried in a gap insulating layer, and an insulating layer between the recording head and the reproducing head, and said magnetic head produces a reproduction output which is subject to zero-crossing detection without passing through a differential circuit.

5. The magnetic recording and reproducing method of claim 4 wherein said hexagonal ferrite magnetic material is a barium ferrite magnetic material and said magnetic layer has a coercivity squareness ratio (S$\perp$*) of at least 0.90–1 as measured in a direction perpendicular to the recording surface thereof.

6. The magnetic recording and reproducing method of claim 4 wherein said head has an inductance of 0.1 2 μH.

7. The magnetic recording and reproducing method of claim 4 wherein said medium is a coated magnetic recording medium having a magnetic layer formed by coating a magnetic coating composition.

8. The magnetic recording and reproducing method of claim 4 wherein said magnetic layer has a surface roughness (Ra) of up to 5 nm.

9. The magnetic recording and reproducing method of claim 4 wherein said magnetic layer has a coercivity (Hc) of 1,100–2,000 Oe as measured in the direction of movement relative to the head.

* * * * *

UNITED STATES PATENT AND TRADEMARK OFFICE
CERTIFICATE OF CORRECTION

PATENT NO. : 5,530,609
DATED      : June 25, 1996
INVENTOR(S): Keiji KOGA, et al.

It is certified that error appears in the above-indentified patent and that said Letters Patent is hereby corrected as shown below:

On the title page, Item [54], the Title, and column 1, should read:
-- [54] MAGNETIC RECORDING/REPRODUCING METHOD USING A THIN FILM MAGNETIC HEAD. --

Signed and Sealed this

Eighth Day of October, 1996

Attest:

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,530,609

DATED : June 25, 1996

INVENTOR(S) : KOGA et al.

It is certified that error appears in the above-indentified patent and that said Letters Patent is hereby corrected as shown below:

In column 26, lines 4 and 5, delete "at least".

In column 26, line 8, change "0.1 2" to --0.1-2--.

In column 26, line 34, delete "at least".

In column 26, line 38, change "0.1 2" to --0.1-2--.

Signed and Sealed this

Nineteenth Day of November, 1996

Attest:

BRUCE LEHMAN

*Attesting Officer*    *Commissioner of Patents and Trademarks*